Dec. 2, 1958     A. SEARLES     2,862,396
IDLER ROLLER
Filed June 28, 1954
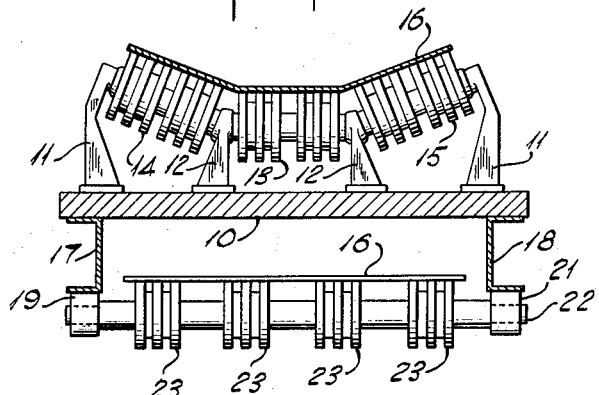
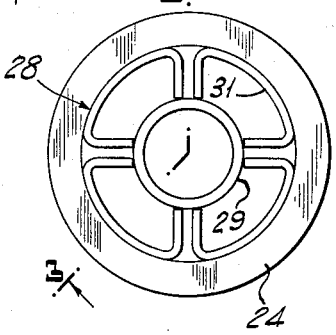
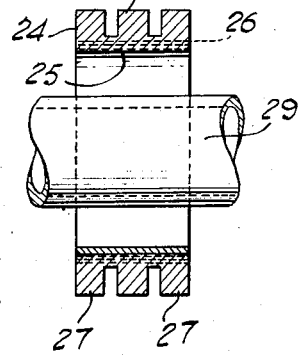
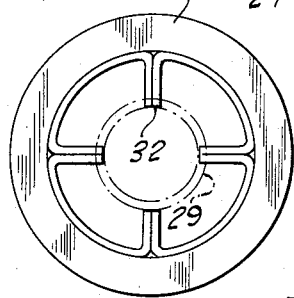
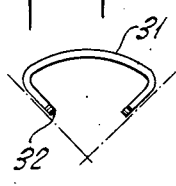
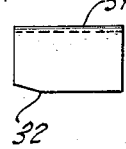
INVENTOR
*AMOS SEARLES*
BY
*Moses, Nolte, & Nolte*
ATTORNEYS

United States Patent Office 2,862,396
Patented Dec. 2, 1958

2,862,396
IDLER ROLLER
Amos Searles, Scranton, Pa.

Application June 28, 1954, Serial No. 439,587

8 Claims. (Cl. 74—230.7)

This invention relates to idler units for belt conveyor mechanisms and more particularly to the construction of the roller elements therefor.

Heretofore, the roller elements for conveyor idler units have been made by assembling the resilient roller sleeves, under radial tension, over rigid metal cylindrical hubs or tubular members fixedly attached to a supporting tube or shaft according to my Patent 2,423,407 or by means of resilient deformable sleeves which connect the treads of the supporting tube or shaft, under gripping radial tension, according to my Patent 2,484,752.

To ensure sufficient elastic tension, to create a tight grip of the rubber tread sleeve, and to prevent displacement in operation, these treads are provided with fabric or wire reenforcement near the inner diameter.

It is among the objects of the present invention to provide expandable tread supporting means composed of rigid members serving the purpose of fixedly supporting the resilient tread sleeve in essentially circular form through their contact, under tension, with the inner periphery of said tread sleeve. The tension created by means of the resistance of the tread sleeve is transferred through the expandable tread supporting means to create a gripping force on the central supporting tube or shaft when the assembly of tread sleeve, and expandable supporting means are forced over said central supporting tube or shaft. These units are spaced axially on said shaft to form a suitable idler roller support for conveyor belts.

It is among the objects of the present invention to provide means to facilitate the replacement of worn tread sleeves.

It is another object of the invention to provide means by which tread sleeves of relatively large diameter may be assembled on the central supporting tube or shaft more easily than by the use of rigid hubs, and more economically than by means of resilient deformable connecting sleeves.

The preferred form of the expandable gripping structure comprises a circumferential group of individually rigid segmental members, formed from bar metal width suitable to support the tread sleeve, which provide gripping contact with the central supporting tube or shaft.

The form of each member comprises a portion curved to an outer radius equal to the inner radius of the expanded tread sleeve, each end of said member terminating in a portion radially extending toward the circular center and of such length as to provide gripping expansion to the assembly when forced over the supporting tube or shaft. Thus, a group of segments assembled within the inner periphery of a tread sleeve form an expandable rigid support for the sleeve in circular form.

The segments are of such dimensions circumferentially as to be grouped snugly within the tread sleeve without undue tension thereof, before final assembly on the supporting tube or shaft.

For other objects and for a better understanding of the invention, reference may be had to the following detailed description, taken in connection with the accompanying drawings.

Fig. 1 is a transverse section of a conveying mechanism employing the roller elements of the present invention.

Fig. 2 is an enlarged end view of one of the roller elements with the rigid segments in expanded operating position.

Fig. 3 is a fragmentary side view, partly in section, taken on line 3—3 of Fig. 2 of one of the roller elements assembled on a supporting tube.

Fig. 4 is an enlarged end view of a sleeve and segments arranged for mounting on a supporting tube or shaft, showing diameters of both the shaft and the radially extending portion of the segments.

Fig. 5 is an end view of a single segment.

Fig. 6 is a longitudinal view of a segment showing the lower ends of the radial extensions beveled slightly for the purpose of facilitating final assembly on the supporting member.

Referring now to Fig. 1, 10 is a base which carries opposing vertical supports 12, 12 formed at their head ends so as to accommodate a central roller structure 13 and two outer roller structures 14 and 15. The outer roller structures are disposed at an upwardly inclined angle and are accommodated at the upper ends by the head portion of offset supports 11, 11 to cause the conveyor belt 16 passing thereover to assume a trough shape and to better contain the material being conveyed.

A roller structure includes channel pieces 17 and 18 secured to the ends of the base 10 and respectively carrying on their bottom flanges bearing blocks 19 and 21 in which idler shaft 29 is journaled at ends 22. This shaft 29 carries several lower roller elements 23. The roller elements 23 are axially aligned, so that they flatly support the return portion of conveyor belt 16.

Referring now to Figs. 2 and 3, a single roller 20 of the type used on the upper or lower roller structures 13, 14, 15, 23 is shown. Two or more of these rollers 20 are utilized for each structure.

These rollers 20 include a tread element 24 having a base portion 25 with fabric or wire reenforcement 26 therein and with two or more treads 27.

The reenforcement is essentially inextensible in order that the tread will not be unduly expanded radially but yet will be flexible enough to conform to the forces set up in the rubber at least for a slight radial extension. This tread element receives considerable wear from the conveyor belt 16, and eventually the treads 27 become worn down to the reenforced base portion 25. When this takes place it is desired that the tread elements 24 be replaced.

The roller element 20 further includes means, indicated generally at 28, for connecting the tread element 24 to an idler shaft 29. This connecting means comprises a radially expandable group of rigid segments 31 which are assembled inside the tread element 24, and which present an inner diameter of their radial portion 32 less than the outer diameter of the supporting tube 29 on which they are forced axially. Accordingly when so forced the group of segments 31 expands and grips both the supporting tube or shaft inwardly and the tread sleeve 24 outwardly creating a radial gripping force by radially deforming that inner resilient base portion of said tread sleeve located radially within said reenforcement 26. Thus the complete organization is united frictionally.

After the tread element 24 has become worn, it may be replaced by another tread element 24. To accomplish this, the idler shafts 29 are removed from supports 11—12—19—21, and the tread element 24 and supporting segments 31 are forced off the shaft 29 releasing said segments 31 which are reassembled within a new tread element 24, thus providing a complete renewal of the unit.

The preliminary assembly, prior to mounting on the supporting tube 29 or shaft, is shown in Fig. 4 which includes the roller tread element 24 and four segmental supporting members 31. The inwardly projecting radial portions 32 are shown to present an included diameter less than that of the supporting tube or shaft 29 over which this complete assembly is to be forced and finally located under gripping tension.

Fig. 5 shows the axial view of one of the segments 31 made of rigid strip metal, having the radial members slightly beveled at one end to facilitate radial displacement over the supporting tube or shaft 29 during final assembly.

Fig. 6 shows the circumferential view of one of the segments 31 of rigid strip metal which is to be made of such gauge as service requires. In lieu of formed strip metal, however, it is understood that these segments may be formed by other methods, such as rolling, extruding or other means.

I have described what I believe to be the best embodiments of my invention. I do not wish, however, to be confined to the embodiment shown, but what I desire to cover by Letters Patent is set forth in the appended claims.

I claim:

1. An apparatus adapted to insure elastic tension between a conveyor sleeve and an idler shaft which apparatus includes a radially deformable resilient inner boundary on the sleeve and expandable means disposed between said inner boundary and the shaft exerting radial gripping pressure on the shaft and on said inner boundary, said expandable means including a plurality of separate segments adapted for independent adjustable pre-selected positioning with respect to said inner boundary each segment comprising an arcuate circumferential portion and radially extending side portions.

2. An apparatus adapted to insure elastic tension between a conveyor sleeve and an idler shaft as in claim 1, wherein the area of the gripping surface of said segments on said inner boundary is substantially equal to the area of said inner boundary.

3. In a roller structure for a conveyor mechanism, a rotary idler shaft, bearing supports for the shaft, a radially deformable tread portion having a resilient inner boundary and expandable connecting means including a plurality of substantially rigid separate segments disposed between and directly engaged with the tread and the idler shaft each segment comprising an arcuate circumferential portion and radially extending side portions.

4. In combination, a roller structure comprising a shaft, bearing supports for the shaft, a radially deformable tread portion having a resilient inner boundary, separate rigid segmentally formed units grouped within the tread portion for fixing the tread portion to the shaft, the radially deformable resilient inner boundary of the tread portion exerting radial gripping action upon the group of segmental units and the segmental units exerting radial gripping pressure upon the shaft and tread portion each segment comprising an arcuate circumferential portion and radially extending side portions.

5. In an idler structure for a conveyor mechanism, an idler element shaft, bearing supports for the shaft, a radially deformable tread portion of resilient material with a flexible and inextensible reenforcement therein near the inner boundary of the tread portion, and expandable connecting means including a plurality of separate segments disposed between and directly engaged with the inner boundary of the tread portion and the shaft, said inner boundary of the tread portion exerting radial gripping action upon the connecting means and said connecting means exerting radial gripping action upon both the tread, near its inner boundary and the shaft each segment comprising an arcuate circumferential portion and radially extending side portions.

6. In an idler structure for a conveyor mechanism, an idler element shaft, bearing supports for the shaft, a separate tread portion of resilient material having a radially deformable resilient inner boundary, a flexible and inextensible reenforcement in said tread portion to give rigidity in that region thereof radially outward from said radially deformable resilient inner boundary, radially movable separate connecting segments each comprising an arcuate circumferential portion and radially extending side portions and being disposed between the inner boundary tread portion and the idler element shaft for securing the tread portion to the shaft, said connecting segments extending the full axial length of the tread portion, the radially deformable inner boundary of the tread portion exerting radial gripping action upon the segments, and the segments exerting radial gripping action upon both the tread and the shaft.

7. In combination, a tread of cylindrical shape having a radially deformable inner boundary portion, and expandable connecting means including a plurality of separate segments each comprising an arcuate circumferential portion and radially extending side portions disposed within the tread cylinder throughout the full axial length of said tread cylinder and adapted to be positioned against and directly engaged with the tread at its outer radius and a shaft at its inner radius so as to secure the tread to the shaft and exert radial gripping action on both the tread and the shaft.

8. In combination, a cylindrical tread of resilient material having a radially deformable resilient inner boundary, a flexible and inextensible reenforcement in said tread near its radially deformable inner boundary to essentially confine radial extension within the region of the inner boundary, and radially displaceable separate segments each comprising an arcuate circumferential portion and radially extending side portions and being disposed within said tread cylinder and extending the full axial length of the tread portion, said displaceable segments adapted to directly engage a shaft within their inner radius so as to secure and connect said tread cylinder to said shaft and so as to exert radial gripping action on both the tread and the shaft.

References Cited in the file of this patent

UNITED STATES PATENTS

| | | |
|---|---|---|
| 1,087,038 | Moore | Feb. 10, 1914 |
| 1,674,635 | Burden | June 26, 1928 |
| 2,215,053 | Reese | Sept. 17, 1940 |
| 2,423,407 | Searles et al. | July 1, 1947 |
| 2,484,752 | Searles | Oct. 11, 1949 |
| 2,638,073 | Carter | May 12, 1953 |
| 2,704,102 | Starr et al. | Mar. 15, 1955 |